US008180659B2

(12) United States Patent
Atkin et al.

(10) Patent No.: US 8,180,659 B2
(45) Date of Patent: May 15, 2012

(54) IDENTIFYING AND MEASURING ADHERENCE TO SOFTWARE DEVELOPMENT REQUIREMENTS

(75) Inventors: Steven Edward Atkin, Wesley Chapel, FL (US); Michael Francis Moriarty, Byron, MN (US); Dale Martin Schultz, Chelmsford, MA (US); William James Sullivan, Bethal, CT (US); Susan Jane Williams, Sherman, CT (US); Luis Zapata, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 1096 days.

(21) Appl. No.: 12/049,299

(22) Filed: Mar. 15, 2008

(65) Prior Publication Data
US 2008/0163157 A1   Jul. 3, 2008

Related U.S. Application Data

(63) Continuation of application No. 11/249,942, filed on Oct. 13, 2005, now abandoned.

(51) Int. Cl.
G06F 17/30   (2006.01)
(52) U.S. Cl. ...................................... 705/7.11
(58) Field of Classification Search .................. 705/7.11
See application file for complete search history.

(56) References Cited

U.S. PATENT DOCUMENTS

| | | | |
|---|---|---|---|
| 5,949,999 A | 9/1999 | Song et al. | 395/701 |
| 5,999,908 A * | 12/1999 | Abelow | 705/7.32 |
| 6,236,990 B1 | 5/2001 | Geller et al. | 707/5 |
| 6,658,642 B1 | 12/2003 | Megiddo et al. | 717/101 |
| 2003/0135842 A1 | 7/2003 | Frey et al. | 717/121 |
| 2004/0059626 A1 | 3/2004 | Smallwood | 705/10 |
| 2004/0123272 A1 | 6/2004 | Bailey et al. | 717/125 |
| 2004/0153464 A1 | 8/2004 | Groves | 707/100 |
| 2004/0243970 A1 | 12/2004 | Ohmori et al. | 717/101 |
| 2008/0215349 A1 | 9/2008 | Baran et al. | 705/1 |

OTHER PUBLICATIONS

Damian et al (GSD'03 The International Workshop on Global Software Development), May 2003, ICSE'03 International Conference on Software Engineering Portland, Oregon, pp. 1-79.*
Jain et al (An Assessment Model for Requirements Identification in Component-Based Software Development), Dec. 2003, The Data Base for Advances in Information Systems vol. 34, No. 4, pp. 48-63.*
Lei et al., "Multiple-Value Decision Supporting Application in Software Production Facing Global Market," 2000 IEEE International Conference on Systems, Man and Cybernetics, Oct. 2000, pp. 346-351.
Haley, "Software Process Improvement At Raytheon," IEEE Software, vol. 13, Issue 6, Nov. 1996, pp. 33-41.
Ning, "A Component-Based Software Development Model," IEEE, Proceedings of 20th International Computer Software and Applications Conference, Aug. 1996, pp. 389-394.

* cited by examiner

*Primary Examiner* — Romain Jeanty
(74) *Attorney, Agent, or Firm* — VanLeeuwen & VanLeeuwen; Jeffrey S. LaBaw (57) ABSTRACT

An approach to identifying and measuring adherence to software development requirements is presented. A software agent provides a user with product and technical questions. In turn, the user provides product and technical answers, or attributes, which are stored in a repository. A globalization plan generator uses the product and technical attributes to generate a software development plan. In addition, a globalization verification test generator uses the globalization plan to generate a test plan and measure the success of the software product based upon the test plan.

17 Claims, 5 Drawing Sheets

IDENTIFYING AND MEASURING ADHERENCE TO SOFTWARE DEVELOPMENT REQUIREMENTS

RELATED APPLICATIONS

This application is a continuation application of U.S. Non-Provisional patent application Ser. No. 11/249,942, entitled "System and Method for Identifying and Measuring Adherence to Software Development Requirements," filed on Oct. 13, 2005 now abandoned.

BACKGROUND OF THE INVENTION

1. Technical Field

The present invention relates to a system and method for identifying and measuring adherence to software development requirements. More particularly, the present invention relates to a system and method for providing product and technical questions to a user and, in response, receiving product and technical attributes for use in generating a globalization plan.

2. Description of the Related Art

Software development and support typically requires assistance from experts in specific disciplines in order to provide a successful software product. For example, a company may develop a software product that the company wishes to provide to multiple countries. In this example, each country may have different software requirements, let alone different languages, and a software developer may not be a subject matter expert in each country's software requirements.

Today, a company may employ subject matter experts for reviewing designs and architectures in order to ensure that a particular software product plan includes particular requirements. A challenge found, however, is that this approach is typically expensive and error prone.

Current systems enable development teams to track software requirements in an automated manner once the software requirements have been identified. A challenge found, however, is that these systems are limited in their ability to identify requirements that require deep knowledge of a geographic market. Currently, software development teams must hire software analysts that have intimate knowledge of the requirements related to individual countries and languages. Each analyst works closely with the development team, which requires a substantial time commitment from both the analyst and the software architects. This approach is subject to errors, costly, and produces inconsistent results.

What is needed, therefore, is a system and method for identifying and measuring adherence to software development requirements for a software development plan.

SUMMARY

It has been discovered that the aforementioned challenges are resolved using a system and method for providing product and technical questions to a user, and receiving corresponding product and technical attributes for use in generating a globalization plan. A software agent provides a user with product and technical questions. In turn, the user provides product and technical answers, or attributes, which are stored in a repository. A globalization plan generator uses the product and technical attributes to generate a software development plan. In addition, a globalization verification test generator uses the globalization plan to generate a test plan and measure the success of the software product based upon the test plan.

A user wishes to supply a software product to global markets, and uses the software agent in conjunction with the globalization plan generator to generate a software globalization plan. For example, the user may be developing a software product that is targeted for the United States, China, and India. In this example, the user may not be aware of the requirements to support the software product in China and India.

A software agent provides product questions and technical questions to the user. The product questions may correspond to which markets (e.g., China, India) the user plans to supply the software product. The technical questions may correspond to the development tools the user plans to use to create the software product. In addition, the software agent may ask security questions such as whether the software product stores credit card numbers or whether the software product asks for a person's name and address.

The user responds to the questions and provides product attributes and technical attributes, which the software agent stores in a repository. A globalization plan generator retrieves the product attributes and the technical attributes, and begins to formulate a globalization plan. First, the globalization plan generator analyzes the product attributes and retrieves expert information from a storage area regarding industry and customer trends, marketing requirements, and local laws to specify what languages are required for basic support and translation. For example, if the product attributes specify that the software product will be supplied to India, the globalization plan generator retrieves expert information pertaining to India.

Next, the globalization plan generator analyzes the technical attributes and retrieves expert information from the storage area that specifies particular implementation techniques, such as "Unicode must be used to comply with GB18030," which is a Chinese national standard for encoding Chinese text. In addition, the globalization plan generator identifies whether the development tools the user specified will provide the required implementation techniques. The globalization plan generator generates a globalization plan based upon the product and technical analysis, and provides the globalization plan to the user. In turn, the user reviews the globalization plan and makes changes accordingly.

Once the globalization plan is updated, plan data and deviation data are generated and sent to geography teams and deviation review teams. In turn, the geography teams and the deviation review teams provide feedback that is incorporated into the updated globalization plan. Once the feedback is incorporated into the updated globalization plan, the updated globalization plan is sent to a globalization verification test (GVT) generator.

The GVT generator determines test requirements based upon the updated globalization plan, and includes the tests in a GVT test plan, which is stored in a repository. A centralized organization, such as a "globalization center of competency" organization, may review the GVT test plan and offer suggestions that test planners may accept or reject.

The GVT test plan is sent to a globalization verification test system, which executes the GVT test plan on the software product and, in turn, generates scorecards that include the success and failure of the tests. As a result, GVT test personnel may modify the GVT test plan in order to improve the test results.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
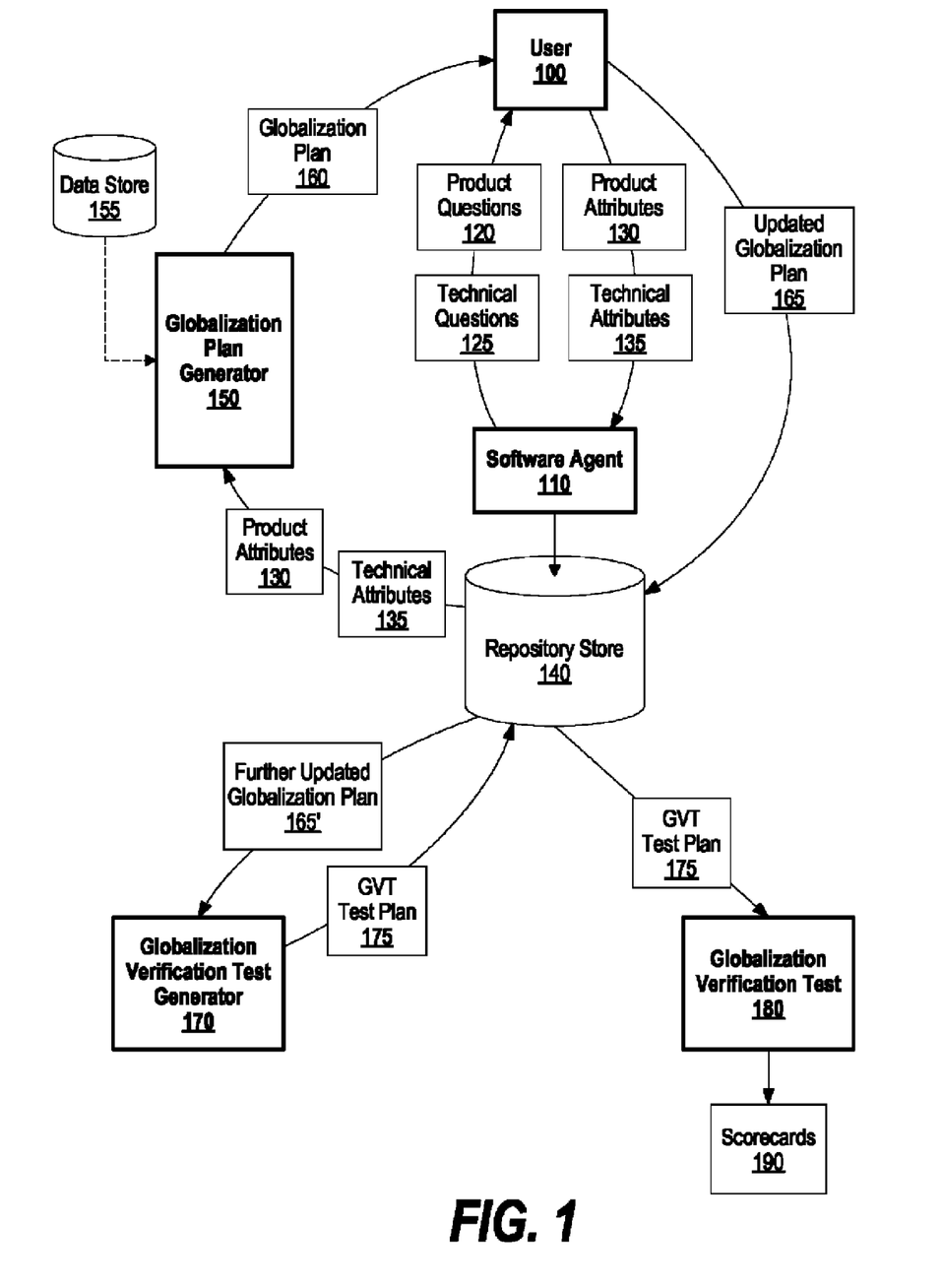
FIG. 1 is a diagram showing a user providing product and technical attributes based upon product and technical questions, and a globalization plan generator generating a software development plan based upon the product and technical attributes.

FIG. 1 is a diagram showing a user providing product and technical attributes based upon product and technical questions, and a globalization plan generator generating a software development plan based upon the product and technical attributes. User 100 wishes to supply a software product to global markets, and uses software agent 110 in conjunction with globalization plan generator 150 to generate a software globalization plan. For example, user 100 may be developing a software product that is targeted for the United States, China, and India. In this example, user 100 may not be aware of the requirements to support the software product in China and India. Software agent 110 asks particular questions, such as the software product's target markets, and globalization plan generator 150 generates a globalization plan based upon user 100's answers.

Software agent 110 provides product questions 120 and technical questions 125 to user 100. Product questions 120 may correspond to which markets (e.g. China, India) user 100 plans to supply the software product. Technical questions 125 may correspond to the development tools user 100 plans to use to create the software product or other technical related questions. For example, software agent 110 may ask security questions such as whether the software product stores credit card numbers or whether the software product asks for a person's name and address.

User 100 responds to the questions and provides product attributes 130 and technical attributes 135, which software agent 110 stores in repository store 140. Product attributes 130 may include an international market, such as China, where the software product is supplied. Repository store 140 may be stored on a nonvolatile storage area, such as a computer hard drive. Globalization plan generator 150 retrieves product attributes 130 and technical attributes 135 and begins to formulate a globalization plan. Globalization plan generator 150 analyzes product attributes 130, and retrieves expert information from data store 155 regarding industry and customer trends, marketing requirements, and local laws to specify what languages are required for basic support and translation. For example, if product attributes 130 specify that the software product will be supplied to India, globalization plan generator 150 retrieves expert information pertaining to India. Data store 155 may be stored on a nonvolatile storage area, such as a computer hard drive.

Globalization plan generator 150 analyzes technical attributes 135 and retrieves expert information from data store 155 to specify particular implementation techniques, such as "Unicode must be used to comply with GB18030," which is a Chinese national standard for encoding Chinese text. In addition, globalization plan generator 150 identifies whether the development tools that user 100 specified will provide the specific implementation techniques.

Globalization plan generator 150 generates globalization plan 160 and provides it to user 100. Globalization plan 160 includes baseline requirements, language translation requirements, technical requirements, and inherited requirements. For example, supporting "input method editors" for inputting text is an inherited requirement for the Asian marketplace. In the Chinese marketplace, the requirement is further refined to state that the software must support a "Pin Yin Input Method Editor." Globalization plan 160 may also include links to supporting processes, tools, education, and other resource data. In turn, user 100 reviews globalization plan 160, makes changes, and stores updated globalization plan 165 in repository store 140.

A test team executes updated globalization plan 165. If certain parts cannot be executed or a test fails, the test team reports this information to globalization plan generator 150, whereby globalization plan generator 150 generates deviations if required. For example, a deviation may be that the software does not allow a user to input text using the "Pin Yin Input Method Editor." The plan data and deviation data are sent to geography teams and deviation review teams. In turn, the geography teams and review teams provide feedback that are incorporated into updated globalization plan 165 (see FIG. 2 and corresponding text for further details regarding geography teams and review teams).

Once the feedback is incorporated into further updated globalization plan 165', further updated globalization plan 165' is sent to globalization verification test (GVT) generator 170. GVT generator 170 determines which test need to be performed on the software product based upon further updated globalization plan 165', and includes the tests in a software development plan (GVT test plan 175), which is stored in repository store 140. For example, if a user answered "Yes" to the question "Does your software accept the input of dates," then globalization plan generator 150 looks up required tests. In this example, one of the required tests is to check that dates can be input in different formats, such as "MM/DD/YY" and "YY/MM/DD."

Figure 4:
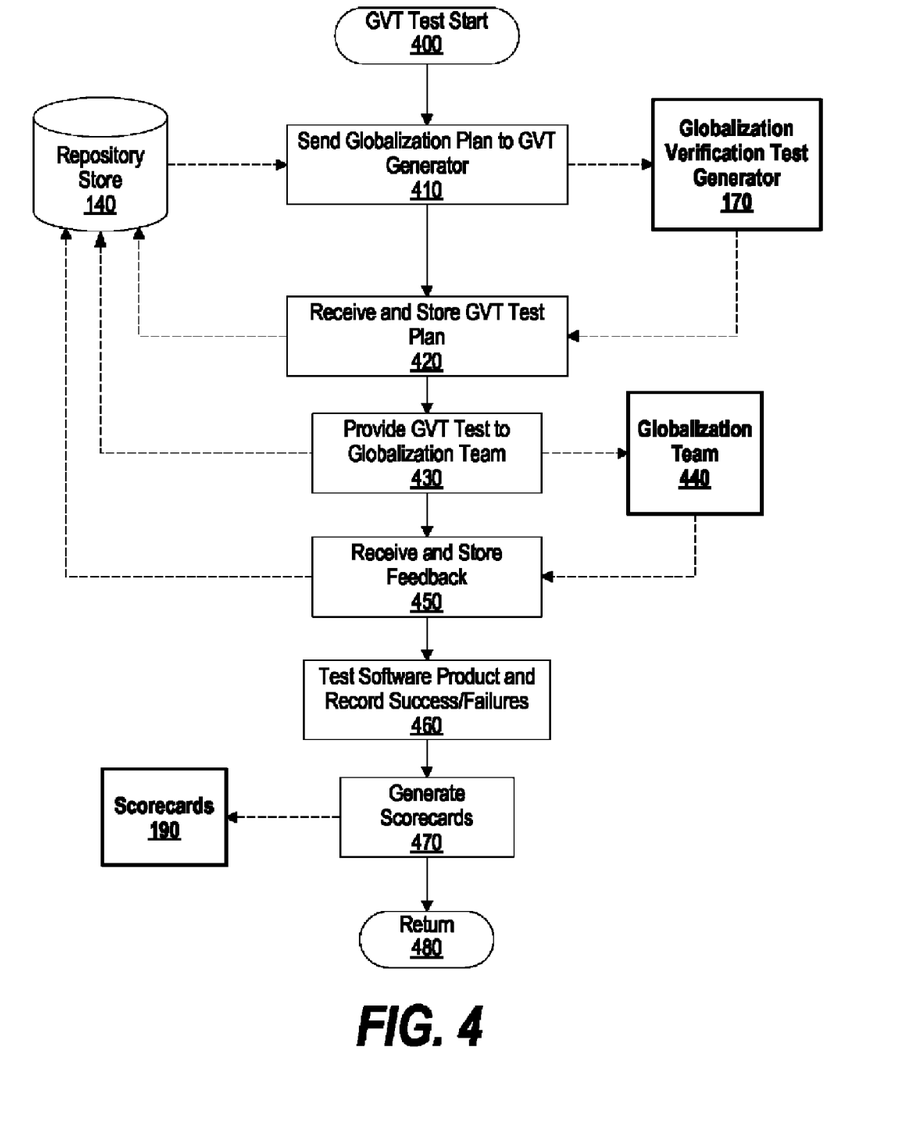
FIG. 4 is a flowchart showing steps taken in generating a globalization verification test (GVT) plan and measuring a software product's success based upon the plan.

A centralized organization, such as a "globalization center of competency" organization, may review GVT test plan 175 and offer suggestions that test planners may accept or reject (see FIG. 4 and corresponding text for further details regarding test plan generation).

GVT test plan 175 is sent to Globalization verification test 180, which executes GVT test plan 175 and, in turn, globalization verification test 180 records the success and failure of the tests performed and generates scorecards 190 that includes the test results. In turn, GVT test personnel may modify GVT test plan 175 in order to improve its results.

Figure 2:
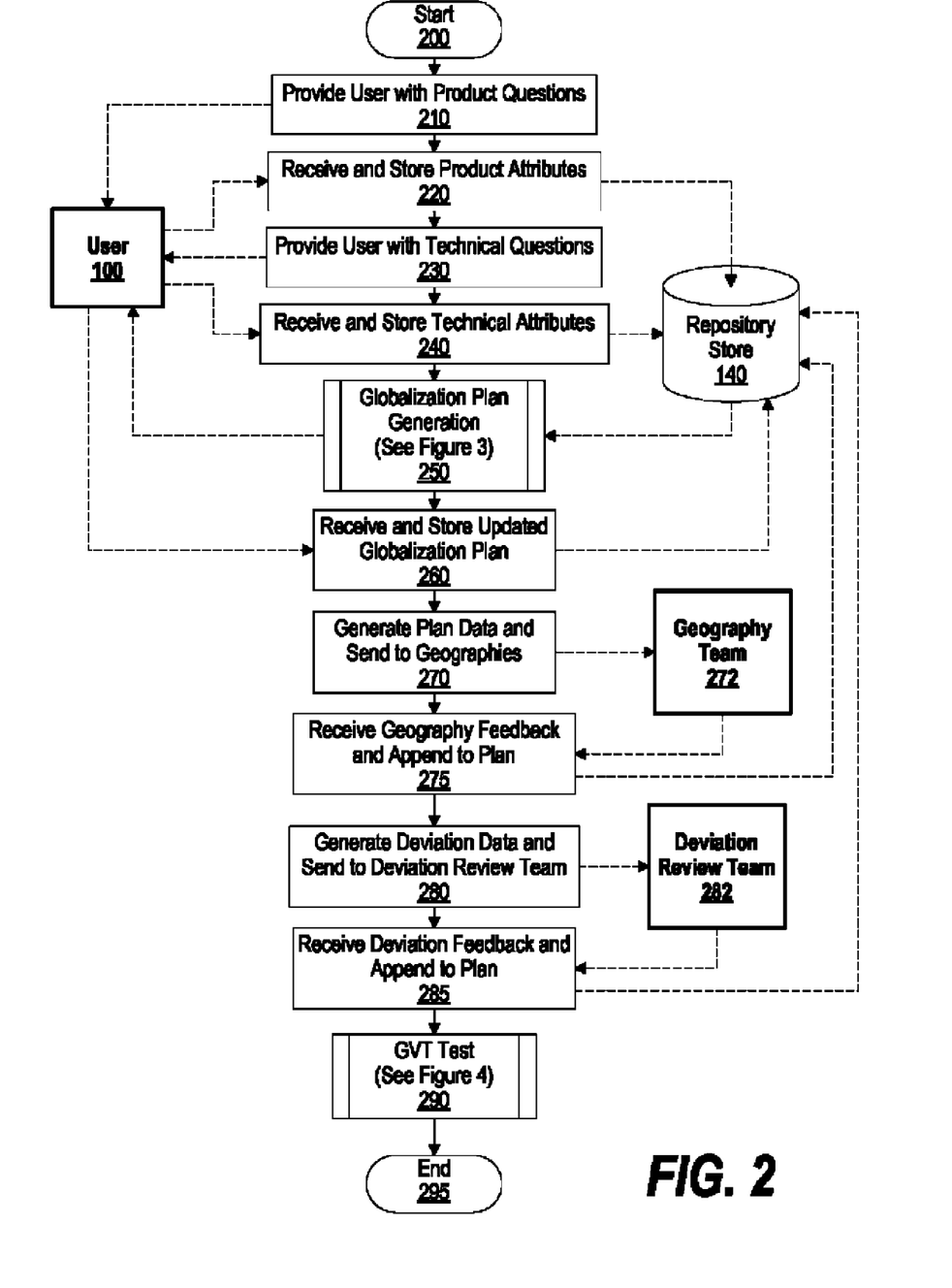
FIG. 2 is a high-level flowchart showing steps taken in providing product and technical questions to a user, receiving product and technical attributes, and generating a globalization plan.

FIG. 2 is a high-level flowchart showing steps taken in providing product and technical questions to a user, receiving product and technical attributes, and generating a globalization plan. Processing commences at 200, whereupon processing provides user 100 with product questions (step 210). For example, the product questions may correspond to the software product's version/level, its target market(s), its audience, and its related products (e.g. part of a software suite). User 100 is the same as that shown in FIG. 1.

User 100 provides product attributes, which are received and stored in repository store 140 at step 220. The product attributes include answers to the product questions, and may include a software product's version/level, target market (e.g. international markets), customer base, and whether it is part of a larger software suite. Repository store 140 is the same as that shown in FIG. 1.

At step 230, processing provides user 100 with technical questions. The technical questions may correspond to the languages and tools that will develop the software product (e.g. C++, Java or Eclipse or ICU), planned encodings (use of Unicode or country-specific code pages), separation of translatable material, and handling of cultural data. User 100 provides technical attributes (answers to the technical questions), which are received and stored in repository store 140 at step 240.

Figure 3:
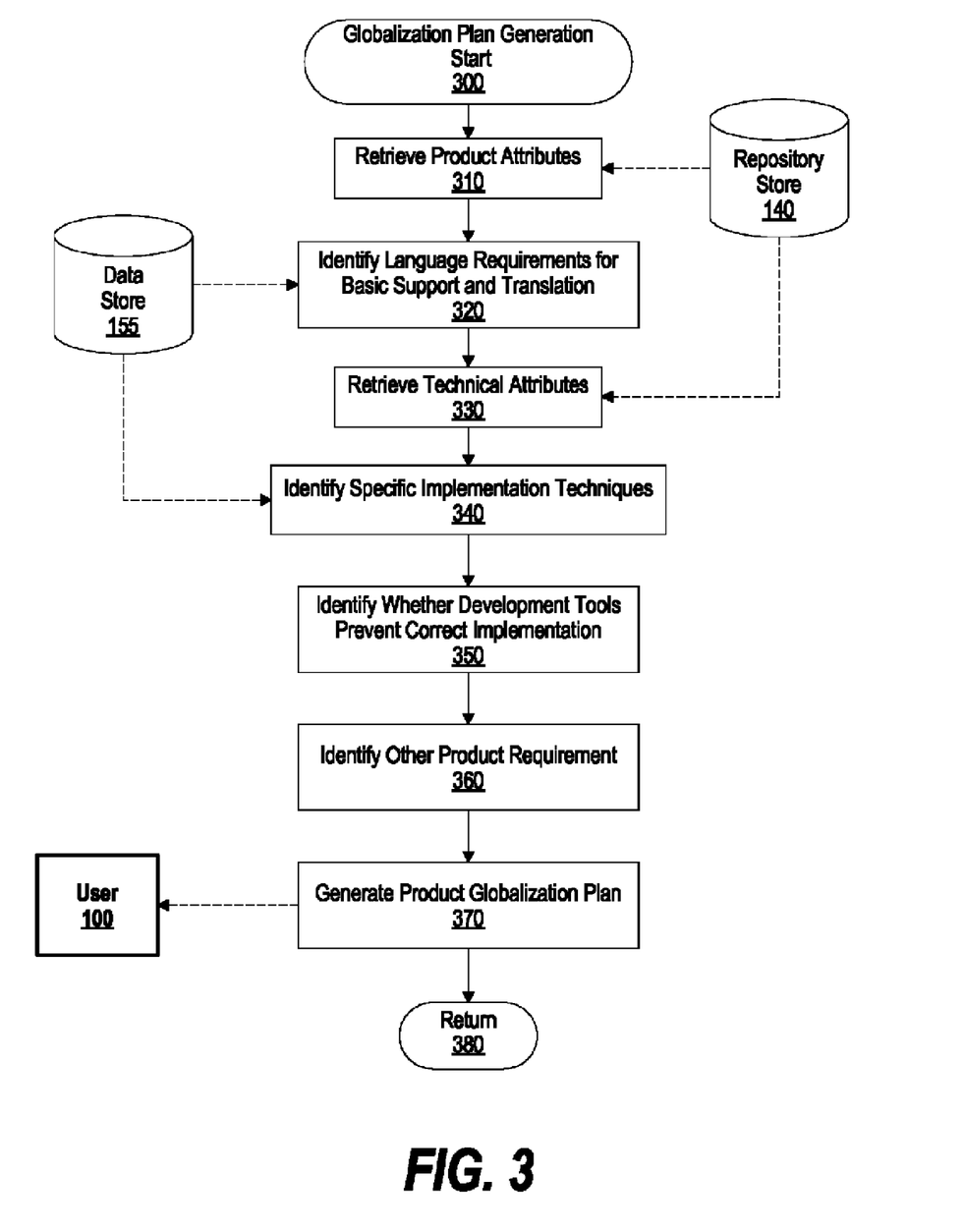
FIG. 3 is a flowchart showing steps taken in generating a globalization plan based upon product and technical attributes.

Using the product attributes and technical attributes located in repository store 140, processing generates a globalization plan for the software product and provides the globalization plan to user 100 (pre-defined process block 250, see FIG. 3 and corresponding text for further details). At step 260, processing receives feedback from user 100 regarding the globalization plan, which is stored in repository store 140 as an updated globalization plan. Processing may record the fields that are changed by user 100 in order to track the globalization plan's changes.

Processing generates plan data (e.g. a translation plan, etc), which is sent to geography team 272 at step 270. Geography team 272 may specialize in a particular country that corresponds to the software product's target markets. For example, if the software product is targeted to the China market, the plan data is sent to an organization that specializes in the China market. Geography team 272 reviews the plan data and provides plan feedback, which is appended to the updated globalization plan at step 275.

Processing generates deviation data (e.g. deviations to particular requirements), which is sent to deviation team 282 at step 280. Deviation team 282 reviews the deviation data and provides deviation feedback, which processing appends (links) to the updated globalization plan at step 285.

At step 290, processing generates a globalization test verification plan and measures the software product against the plan (pre-defined process block 290, see FIG. 4 and corresponding text for further details). Processing ends at 295.

FIG. 3 is a flowchart showing steps taken in generating a globalization plan based upon product and technical attributes. The globalization plan uses expert information regarding industry trends, customer trends, marketing requirements and local laws to specify particular support and translation requirements for targeted countries and/or regions.

Processing commences at 300, whereupon processing retrieves product attributes generated by a user (e.g. software planner) from repository store 140 (step 310). At step 320, processing retrieves expert information from data store 155 regarding industry and customer trends, marketing requirements, and local laws, in order to identify languages that are required for basic support and translation. For example, if the product attributes specify that the software product will be supplied to India, processing retrieves expert information pertaining to India. Repository store 140 and data store 155 are the same as that shown in FIG. 1, and may be stored on a nonvolatile storage area, such as a computer hard drive.

At step 330, processing retrieves technical attributes from repository store 140. At step 340, processing retrieves expert information from data store 155 to specify particular implementation techniques, such as "Unicode must be used to comply with GB18030." Processing uses information about tool and/or technology deficiencies to determine whether they prevent correct implementation (non-compliance) at step 350. For example, Install Shield does not permit entry of bi-directional data and, in this example, if bi-directional data is a requirement, the user may have to use a program other than Install Shield. Processing uses related product information and requirements to apply additional requirements to the software product at step 360. For example, a high level requirement may be that software products shipping as part of "Software Suite ABC" must be translated into Danish.

Processing generates a product globalization plan at step 370, which is provided to user 100. The product globalization plan includes baseline requirements, technical requirements, non-compliance remarks, and inherited requirements. The product globalization plan may also include links to supporting processes, tools, education, and other resource data. Processing returns at 380.

FIG. 4 is a flowchart showing steps taken in generating a globalization verification test (GVT) plan and measuring a software product's success based upon the plan. Processing commences at 400, whereupon processing retrieves the updated globalization plan from repository store 140, and provides it to globalization verification test generator 170 at step 410. GVT generator 170 determines which tests need to be performed on the software product based upon the updated globalization plan, and generates a test plan. At step 420, processing receives a GVT plan and stores the plan in repository store 140. Globalization verification test generator 170 and repository store 140 are the same as that shown in FIG. 1.

At step 430, processing provides the GVT test plan to globalization team 440, which reviews review the GVT test plan and offer suggestions that test planners may accept or reject. Globalization team 440 may be a centralized organization, such as a "globalization center of competency" organization, that specializes in particular countries or regions of the world. Processing receives globalization team 440's feedback at step 450, which it stores in repository store 140.

Processing tests the software product using the GVT test and records successes and failures (step 460). At step 470, processing generates scorecard 190 that includes the GVT test results. A test developer may review scorecards 190 and modify the GVT test accordingly. Scorecards 190 is the same as that shown in FIG. 1. Processing returns at 480.

Figure 5:
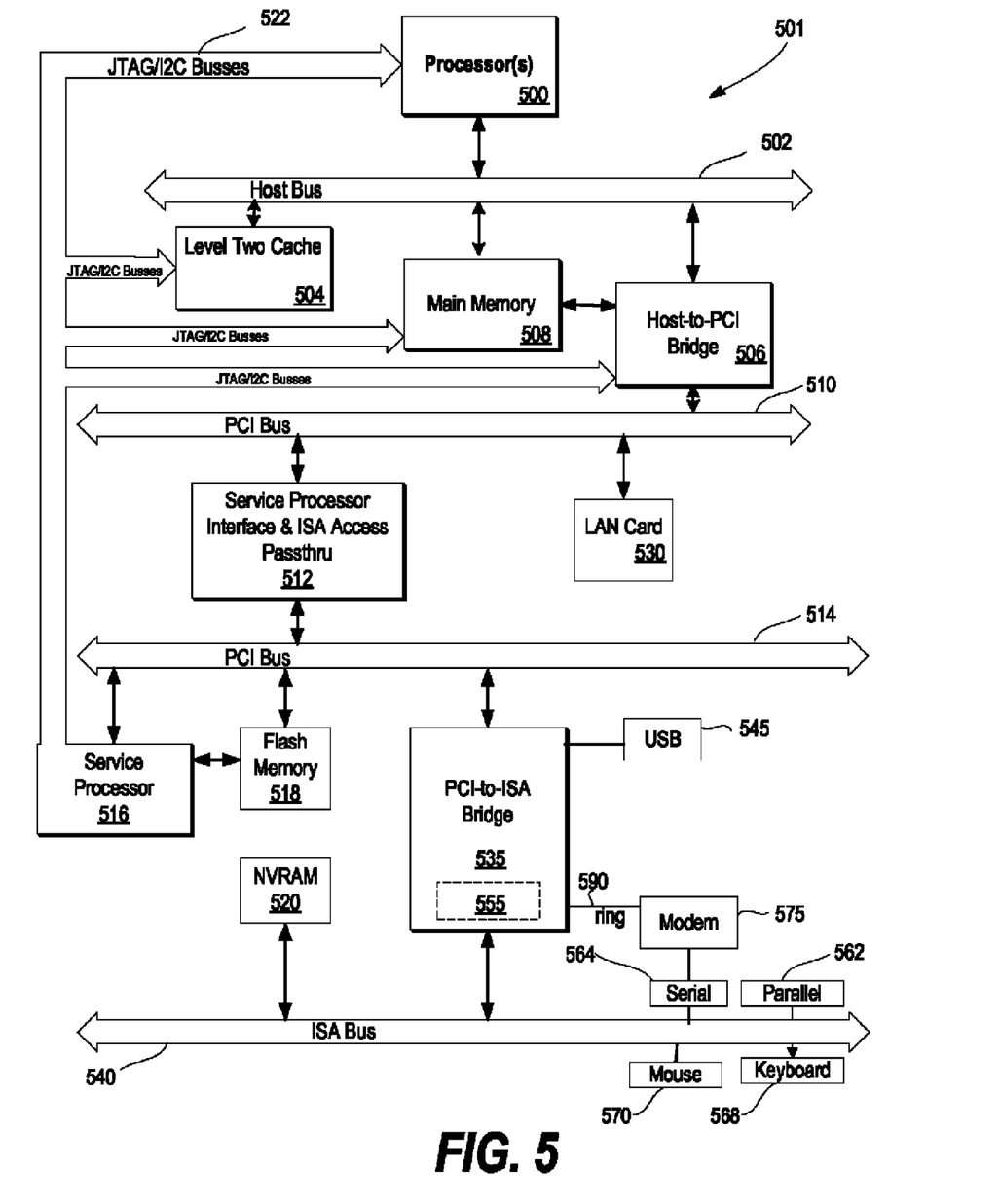
FIG. 5 is a block diagram of a computing device capable of implementing the present invention.

FIG. 5 illustrates information handling system 501, which is a simplified example of a computer system capable of performing the computing operations described herein. Information handling system 501 includes processor 500, which is coupled to host bus 502. A level two (L2) cache memory 504 is also coupled to host bus 502. Host-to-PCI bridge 506 is coupled to main memory 508, includes cache memory and main memory control functions, and provides bus control to handle transfers among PCI bus 510, processor 500, L2 cache 504, main memory 508, and host bus 502. Main memory 508 is coupled to Host-to-PCI bridge 506 as well as host bus 502. Devices used solely by host processor(s) 500, such as LAN card 530, are coupled to PCI bus 510. Service Processor Interface and ISA Access Pass-through 512 provides an interface between PCI bus 510 and PCI bus 514. In this manner, PCI bus 514 is insulated from PCI bus 510. Devices, such as flash memory 518, are coupled to PCI bus 514. In one implementation, flash memory 518 includes BIOS code that incorporates the necessary processor executable code for a variety of low-level system functions and system boot functions.

PCI bus 514 provides an interface for a variety of devices that are shared by host processor(s) 500 and Service Processor 516 including, for example, flash memory 518. PCI-to-ISA bridge 535 provides bus control to handle transfers between PCI bus 514 and ISA bus 540, universal serial bus (USB) functionality 545, power management functionality 555, and can include other functional elements not shown, such as a real-time clock (RTC), DMA control, interrupt support, and system management bus support. Nonvolatile RAM 520 is attached to ISA Bus 540. Service Processor 516 includes JTAG and I2C busses 522 for communication with processor(s) 500 during initialization steps. JTAG/I2C busses 522 are also coupled to L2 cache 504, Host-to-PCI bridge 506, and main memory 508 providing a communications path between the processor, the Service Processor, the L2 cache, the Host-to-PCI bridge, and the main memory. Service Processor 516 also has access to system power resources for powering down information handling device 501.

Peripheral devices and input/output (I/O) devices can be attached to various interfaces (e.g., parallel interface 562, serial interface 564, keyboard interface 568, and mouse interface 570 coupled to ISA bus 540. Alternatively, many I/O devices can be accommodated by a super I/O controller (not shown) attached to ISA bus 540.

In order to attach computer system 501 to another computer system to copy files over a network, LAN card 530 is coupled to PCI bus 510. Similarly, to connect computer system 501 to an ISP to connect to the Internet using a telephone line connection, modem 555 is connected to serial port 564 and PCI-to-ISA Bridge 535.

While the computer system described in FIG. 5 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   providing one or more product questions and one or more technical questions to a user, wherein the product questions and the technical questions correspond to a software product currently being developed by the user;
   receiving, from the user, one or more product attributes corresponding to the product questions and one or more technical attributes corresponding to the technical questions, wherein the technical attributes include one or more specified development tools used by the user to develop the software product;
   analyzing, by a processor, the product attributes and the technical attributes received from the user, wherein the analyzing further comprises determining if the specified development tools provide one or more required implementation techniques; and
   generating a software development plan for the software product based upon the analysis, wherein the generating further comprises including a noncompliance remark in the software development plan in response to determining that the specified development tools do not provide the required implementation techniques.

2. The method of claim 1 wherein the analyzing further comprises:
   retrieving expert information from a data storage area; and
   comparing the expert information with the product attributes and the technical attributes.

3. The method of claim 1 wherein the product attributes include an international marketplace; and
   wherein the software development plan includes a globalization plan corresponding to the international marketplace.

4. The method of claim 3 further comprising:
   identifying language translation requirements corresponding to the international marketplace; and
   including the language translation requirements in the globalization plan.

5. The method of claim 1 further comprising:
   providing the software development plan to a test generator; and
   receiving, from the test generator, a software verification test plan based upon the software development plan.

6. The method of claim 5 further comprising:
   testing the software product using the software verification test plan; and
   generating a scorecard based upon the testing.

7. A computer program product stored in a computer readable storage medium, comprising computer program code that, when executed by an information handling system, causes the information handling system to perform actions comprising:

providing one or more product questions and one or more technical questions to a user, wherein the product questions and the technical questions correspond to a software product currently being developed by the user;

receiving, from the user, one or more product attributes corresponding to the product questions and one or more technical attributes corresponding to the technical questions, wherein the technical attributes include one or more specified development tools used by the user to develop the software product;

analyzing the product attributes and the technical attributes received from the user, wherein the analyzing further comprises determining if the specified development tools provide one or more required implementation techniques; and     generating a software development plan for the software product based upon the analysis, wherein the generating further comprises including a noncompliance remark in the software development plan in response to determining that the specified development tools do not provide the required implementation techniques.

8. The computer program product of claim 7 wherein the actions further comprise:

retrieving expert information from a data storage area; and     comparing the expert information with the product attributes and the technical attributes.

9. The computer program product of claim 7 wherein the product attributes include an international marketplace; and     wherein the software development plan includes a globalization plan corresponding to the international marketplace.

10. The computer program product of claim 9 wherein the actions further comprise:

identifying language translation requirements corresponding to the international marketplace; and     including the language translation requirements in the globalization plan.

11. The information handling system of claim 9 wherein the plan generation tool is further effective to:

identify language translation requirements corresponding to the international marketplace; and     include the language translation requirements in the globalization plan.

12. The computer program product of claim 7 wherein the actions further comprise:

providing the software development plan to a test generator; and     receiving, from the test generator, a software verification test plan based upon the software development plan.

13. The computer program product of claim 12 wherein the actions further comprise:

testing the software product using the software verification test plan; and     generating a scorecard based upon the testing.

14. An information handling system comprising:

one or more processors;

a memory accessible by the processors;

one or more nonvolatile storage devices accessible by the processors; and     a plan generation tool for generating a software development plan, the plan generation tool being effective to:

provide one or more product questions and one or more technical questions to a user over a computer network, wherein the product questions and the technical questions correspond to a software product currently being developed by the user;

receive, from the user, one or more product attributes corresponding to the product questions and one or more technical attributes corresponding to the technical questions, wherein the technical attributes include one or more specified development tools used by the user to develop the software product;

analyze, using one of the processors, the product attributes and the technical attributes received from the user, wherein the analyzing further comprises determining if the specified development tools provide one or more required implementation techniques; and         generate the software development plan for the software product based upon the analysis, wherein the generating further comprises including a noncompliance remark in the software development plan in response to determining that the specified development tools do not provide the required implementation techniques.

15. The information handling system of claim 14 wherein the plan generation tool is further effective to:

retrieve expert information from one of the nonvolatile storage areas; and     compare the expert information with the product attributes and the technical attributes.

16. The information handling system of claim 14 wherein the product attributes include an international marketplace; and     wherein the software development plan includes a globalization plan corresponding to the international marketplace.

17. The information handling system of claim 14 wherein the plan generation tool is further effective to:

provide the software development plan to a test generator; and     receive, from the test generator, a software verification test plan based upon the software development plan.

\* \* \* \* \*